United States Patent
Follen et al.

(10) Patent No.: US 10,023,188 B2
(45) Date of Patent: Jul. 17, 2018

(54) SYSTEMS AND METHODS FOR PRE-HILL CRUISE SPEED ADJUSTMENT

(71) Applicant: Cummins Inc., Columbus, IN (US)

(72) Inventors: Kenneth Follen, Greenwood, IN (US); Vivek A. Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/935,656

(22) Filed: Nov. 9, 2015

(65) Prior Publication Data
US 2017/0129492 A1 May 11, 2017

(51) Int. Cl.
| | | |
|---|---|---|
| B60W 30/14 | (2006.01) | |
| B60W 30/18 | (2012.01) | |
| B60W 10/04 | (2006.01) | |
| B60W 10/18 | (2012.01) | |

(52) U.S. Cl.
CPC ...... *B60W 30/18009* (2013.01); *B60W 10/04* (2013.01); *B60W 10/18* (2013.01); *B60W 2520/10* (2013.01); *B60W 2550/142* (2013.01); *B60W 2720/10* (2013.01)

(58) Field of Classification Search
CPC ... G06F 19/00; G06F 7/00; B60T 8/32; B60K 31/00
USPC ......... 701/70, 93, 94, 96; 180/170; 123/236, 123/325
See application file for complete search history.

(56) References Cited

U.S. PATENT DOCUMENTS

| | | | | |
|---|---|---|---|---|
| 6,374,173 | B1 * | 4/2002 | Ehlbeck | B60K 31/047 180/170 |
| 6,990,401 | B2 * | 1/2006 | Neiss | B60K 31/0058 701/96 |
| 8,498,795 | B2 * | 7/2013 | Eriksson | B60W 10/08 123/236 |
| 2007/0293994 | A1 * | 12/2007 | Zerbini | B60K 6/485 701/22 |
| 2008/0306669 | A1 * | 12/2008 | Wang | B60K 31/00 701/93 |
| 2009/0132142 | A1 | 5/2009 | Nowak et al. | |
| 2009/0164081 | A1 | 6/2009 | Meloche et al. | |

(Continued)

FOREIGN PATENT DOCUMENTS

| | | |
|---|---|---|
| WO | 2013095239 A1 | 6/2013 |
| WO | 2013095242 A1 | 6/2013 |

*Primary Examiner* — Thomas G Black
*Assistant Examiner* — Wae L Louie
(74) *Attorney, Agent, or Firm* — Taft Stettinius & Hollister LLP

(57) ABSTRACT

A system, method, and apparatus includes management of cruise speed in anticipation of upcoming terrain changes. A cruise speed controller can be structured to predict a change in speed of vehicle in light of an upcoming terrain feature, and lead a change in reference speed to which the cruise speed controller is regulating vehicle speed to accommodate the upcoming terrain feature. In one embodiment a physics based model of the vehicle is used to predict a speed change. If predicted speed change exceeds a threshold, the cruise speed controller will initiate a change in speed to either speed up for an upcoming uphill terrain feature, or slow down for an upcoming downhill feature. In one form the distance in advance of the terrain feature as well as the velocity change profile (acceleration or deceleration) are determined by computation of a regression formula.

21 Claims, 9 Drawing Sheets

(56) References Cited

U.S. PATENT DOCUMENTS

| | | | | |
|---|---|---|---|---|
| 2011/0106388 A1* | 5/2011 | Boeckenhoff | ......... | B60W 10/06 701/70 |
| 2011/0276216 A1* | 11/2011 | Vaughan | ............... | B60W 10/06 701/31.4 |
| 2012/0283928 A1* | 11/2012 | Bjernetun | ............. | B60W 10/06 701/93 |
| 2014/0156163 A1* | 6/2014 | Shin | ....................... | B60K 31/00 701/94 |
| 2014/0236448 A1* | 8/2014 | Eriksson | ................ | B60K 31/06 701/93 |
| 2015/0306957 A1* | 10/2015 | Sujan | ..................... | B60K 31/00 701/94 |
| 2017/0129492 A1* | 5/2017 | Follen | ............. | B60W 30/18009 |

\* cited by examiner

SYSTEMS AND METHODS FOR PRE-HILL CRUISE SPEED ADJUSTMENT

TECHNICAL FIELD

The present application generally relates to managing the speed of a vehicle, and in particular to managing the speed of a vehicle operating in various modes of operation such as in a cruise control mode.

BACKGROUND

Vehicle speed may be controlled in various ways, which may result in various efficiency and/or optimization issues. However, these benefits are not heretofore realized with all vehicles. Therefore, further technological developments may be developed in this area.

SUMMARY

One example of a system, method, and apparatus includes a cruise speed controller that is configured to automatically accelerate or decelerate a vehicle in anticipation of an upcoming hill. The automatic change in controlled speed is accomplished by estimating a change in speed of the vehicle in response to upcoming terrain and adjusting a reference control speed to accommodate that change.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying figures wherein like reference numerals refer to like parts throughout the several views, and wherein.

DETAILED DESCRIPTION OF ILLUSTRATIVE EMBODIMENTS

Figure 1:
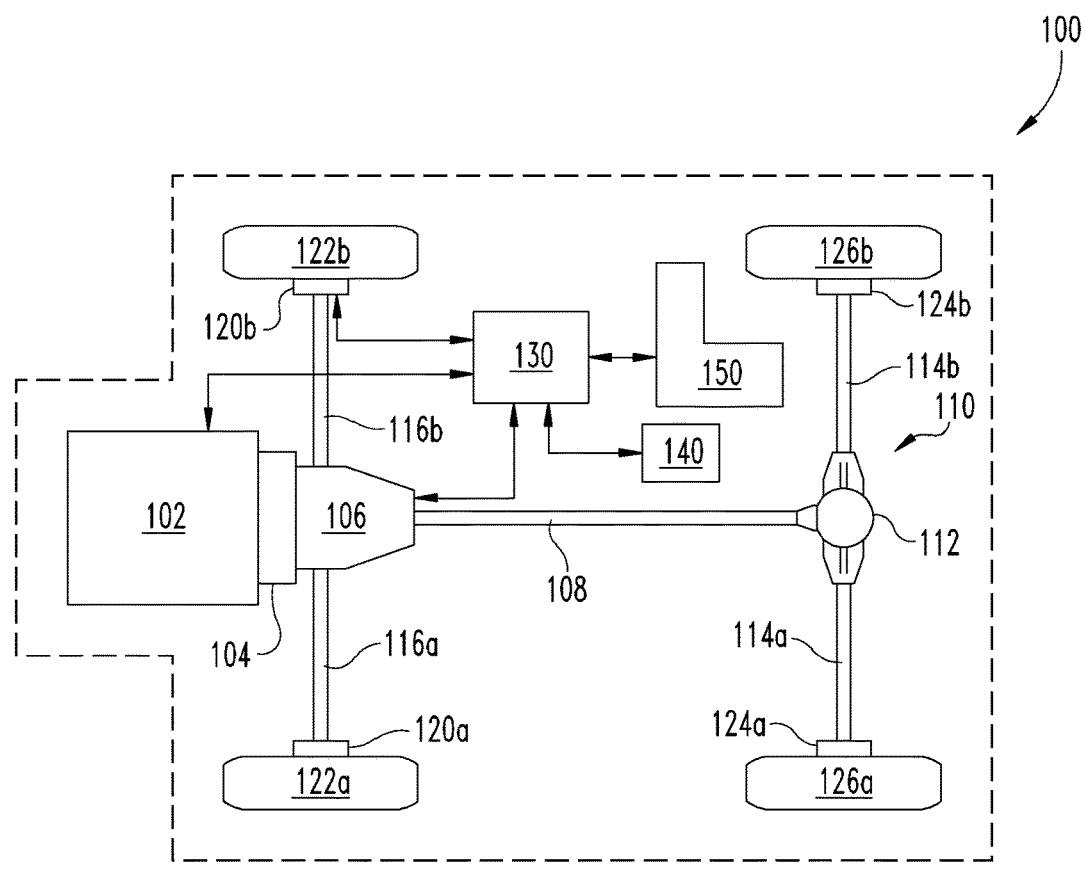
FIG. 1 is a schematic view of an example vehicle system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a schematic view of an example vehicle system 100 including an engine 102, such as an internal combustion engine, structured to generate power for the vehicle system 100. The vehicle system 100 further includes a clutch 104 operably connected to the engine 102 and a transmission 106 for adapting the output torque of the engine 102 via the clutch 104 and transmitting the output torque to a drive shaft 108. Vehicle system 100 illustrates a rear wheel drive configuration including a final drive 110 having a rear differential 112 connecting the drive shaft 108 to rear axles 114a, 114b. It is contemplated that the components of vehicle system 100 may be positioned in different locations throughout the vehicle system 100. In one non-limiting example, in a vehicle having a front wheel drive configuration, the transmission may be a transaxle and the final drive may reside at the front of the vehicle to connect front axles to the engine via the transaxle. It is contemplated that in some embodiments the vehicle may have an all-while drive, and may additionally and/or alternatively be series electric, parallel electric, and pure electric. In some forms the vehicle may be without a transmission/final drive.

In the illustrated embodiment, vehicle system 100 further includes two front brakes 120a, 120b each positioned between and operably connected to two front wheels 122a, 122b and front axles 116a, 116b, respectively. Vehicle system 100 further includes two rear brakes 124a, 124b each positioned between two rear wheels 126a, 126b and rear axles 114a, 114b, respectively. It is contemplated that vehicle system 100 may have more or fewer tires and/or brakes than illustrated in FIG. 1. In certain embodiments, vehicle system 100 may also include various components not shown, such as a fuel system including a fuel tank, a braking system, an engine intake system, and an engine exhaust system, which may include an exhaust aftertreatment system, to name a few examples.

Vehicle system 100 further includes an electronic or engine control unit (ECU) 130, sometimes referred to as an electronic or engine control module (ECM), or the like, which is directed to regulating and controlling the operation of engine 102. In the illustrated embodiment, the ECU 130 includes a transmission control unit (TCU) directed to the regulation and control of transmission 106 operation. A combined ECU 130 and TCU into a single control module may be referred to as a powertrain control module (PCM) or powertrain control unit (PCU), or the like. ECU 130 is in electrical communication with a plurality of vehicle sensors (not shown) in vehicle system 100 for receiving and transmitting conditions of vehicle system 100, such as temperature and pressure conditions, for example. It is contemplated that in certain embodiments ECU 130 may be integrated within the engine 102 and/or the TCU integrated within the transmission 106. Other various electronic control units for vehicle subsystems are typically present in vehicle system 100, such as a braking system electronic control unit and a cruise control electronic control unit, for example, but such other various electronic control units are not show in vehicle system 100 to preserve clarity.

The ECU 130 in the illustrated embodiment is further connected to a fuel storage tank 150, which is generally one component of a larger fuel delivery system. Other component typically included in a fuel system, including a fuel pump, fuel delivery conduit, and other fuel delivery components are not shown in vehicle system 100 to preserve clarity. ECU 130 is further operatively coupled with and may receive a signal from a fuel storage tank level sensor, not shown, operable to provide a signal indicating the level of fuel in the fuel storage tank 150. The fuel storage tank level sensor need not be in direct communication with fuel storage tank 150, and can be located at any position within vehicle system 100 that provides a suitable indication of applicable fuel level readings in fuel storage tank 150.

In the illustrated embodiment, vehicle system 100 further includes a vehicle speed management (VSM) controller 140 operably connected to the ECU 130 for receiving vehicle system 100 sensor data and conditions. It is contemplated that in certain embodiments the VSM controller 140 may be integrated into the ECU 130. The VSM controller 140 includes stored data values, constants, and functions, as well as operating instructions stored on a computer readable medium. It is further contemplated that in certain embodiments ECU 130 and VSM controller 140 may transmit data communication messages across a controller area network (CAN) bus, not shown.

The CAN bus is a vehicle bus standard message-based protocol designed to allow microcontrollers and devices to communicate with each other within the vehicle without a host computer. The CAN bus was initially designed specifically for automotive applications, though modern applications include aerospace, maritime, industrial automation, and medical equipment. It is contemplated that in certain embodiments an alternative vehicle bus protocol may be used, such as a vehicle area network (VAN) or one of the Society of Automotive Engineers (SAE) vehicle bus protocols, for example.

Any of the operations of example procedures described herein may be performed at least partially by the VSM controller 140. In certain embodiments, the controller includes one or more modules structured to functionally execute the operations of the controller. The description herein including modules emphasizes the structural independence of the aspects of the VSM controller 140, and illustrates one grouping of operations and responsibilities of the VSM controller 140. Other groupings that execute similar overall operations are understood within the scope of the present application. Modules may be implemented in hardware and/or instructions stored on a non-transient computer readable medium, and modules may be distributed across various hardware or instructions stored on a non-transient computer readable medium. More specific descriptions of certain embodiments of controller operations are included in the section referencing FIG. 2. Operations illustrated are understood to be example only, and operations may be combined or divided, and added or removed, as well as re-ordered in whole or part, unless stated explicitly to the contrary herein.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, by receiving a value by which the interpreted parameter can be calculated, and/or by referencing a default value that is interpreted to be the parameter value. Furthermore, it is contemplated that the term sensor as used herein may include a virtual sensor, which may determine a condition directly and/or based on other data.

Figure 2:
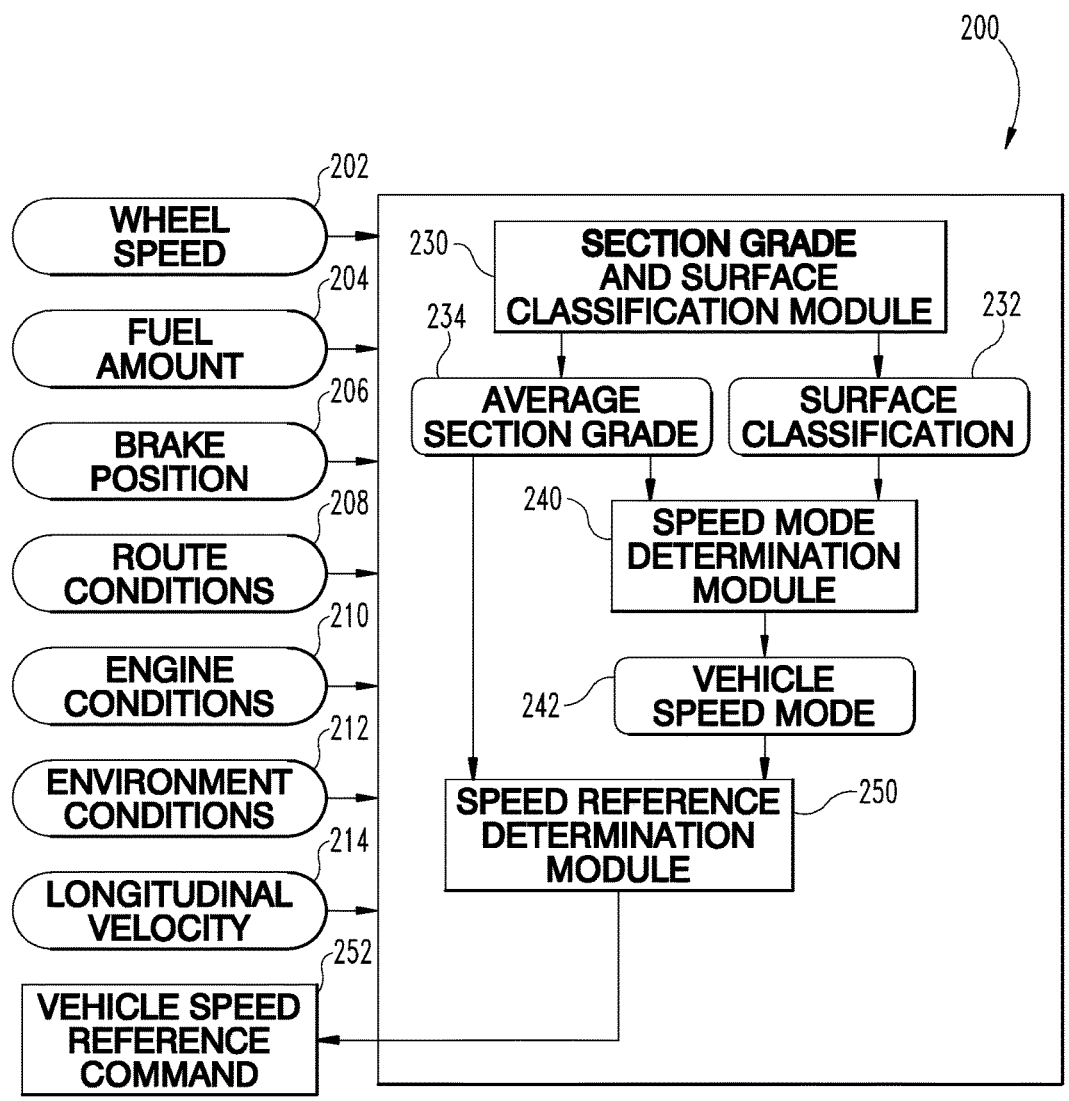
FIG. 2 is a schematic block diagram illustrating an example controller for determining a vehicle speed reference.

One example embodiment 200 of the VSM controller 140 is shown in FIG. 2. In certain embodiments, the VSM controller 140 includes a wheel speed input 202 determined from a wheel speed sensor (alternatively and/or additionally a vehicle speed sensor signal), a fuel amount input 204 determined from the fuel storage tank level sensor, and a brake position input 206 from a brake sensor operable to provide a signal indicating the brake position of any and/or all brakes 120*a*, 120*b*, 124*a*, and 124*b* in vehicle system 100. VSM controller 140 may further include a route conditions input 208, an engine conditions input 210, an environmental conditions input 212, and a vehicle longitudinal velocity input 214 which may be calculated and/or estimated using one or more vehicle sensors.

The route conditions input 208 may include at least one of a route grade (e.g., elevation changes of the route), an elevation, a speed limit minimum, a speed limit maximum, a route trip time, a traffic condition, a stop location and maximum and minimum acceptable speed deviation from a cruise set point. In certain embodiments, one or more of the route condition inputs 208 may be determined from a navigation and positioning device, such as a global position system (GPS) device, an electronic horizon device, and/or route data previously stored in memory. The engine conditions input 210 may include an ambient air pressure input, an ambient air temperature input, an engine throttle position input, an engine speed input, maximum and minimum available engine out torque, a vehicle mass and in some forms an engine torque input determined from one or more engine 102 and/or engine intake system sensors. The environmental conditions input may include a wind input, a precipitation condition, an altitude input, and/or a relative humidity input, an indication of current traffic conditions or proximity to adjacent vehicles each of which may be determined using the one or more vehicle sensors in vehicle system 100 or communicated to the vehicle through vehicle to vehicle or vehicle to server means.

The VSM controller 140 illustrated in FIG. 2 includes a section grade and surface classification module 230, a speed mode determination module 240, and a speed reference determination module 250. Other VSM controller 140 arrangements that functionally execute the operations of the VSM controller 140 are contemplated in the present application.

The section grade and surface classification module 230 receives and interprets the route grade and divides the route grade into one or more sections based on a predetermined section length. The section grade and surface classification module 230 further determines an average grade 234 over at least a portion of the one or more sections and a surface classification 232 for each of the one or more sections. An example section grade and surface classification module 230 determines the surface classification 232 for each section based on each section's grade over the predetermined section length and a grade percentage threshold for each classification. Each section may be classified as one of an uphill surface when the section grade has a positive grade greater than or equal to an uphill surface percentage threshold, a downhill surface when the section grade has a negative grade less than or equal to a downhill surface percentage threshold, or a flat surface when the section grade has a positive grade less than uphill surface percentage threshold or a negative grade greater than the downhill surface percentage threshold.

The speed mode determination module 240 receives and interprets the surface classification 232 for each section and the average grade 234 to determine a vehicle speed mode 242 (e.g., a speed mode of a vehicle operating with an active cruise control set point). An example speed mode determination module 240 may determine each section as being one of a cruise speed mode (i.e., return to or maintain a cruise speed that may be defined by the operator of the vehicle), a pre-uphill speedup speed mode (i.e., speed up before entering an upcoming uphill surface), an uphill slowdown speed mode (i.e., slow down during a hill surface), a pre-downhill slowdown speed mode (i.e., slow down before entering an upcoming downhill surface), and a downhill speedup speed mode (i.e., speed up during a downhill surface).

The speed reference determination module 250 receives and interprets the surface classification 232 and the average grade 234 to determine a vehicle speed reference command 252. In certain embodiments, the speed reference determination module 250 further determines the vehicle speed reference based on at least one of the wheel speed input 202, the fuel amount input 204, the brake position input 206, the route conditions input 208, the engine conditions input 210, the environment conditions input 212, and the vehicle longitudinal velocity 214. In certain embodiments, the speed reference determination module 250 is configured to provide the vehicle speed reference command 252 to one or more vehicle speed regulators and/or one or more output devices. In certain embodiments, the vehicle speed reference command 252 provided to the one or more vehicle speed regulators may include one or more of a brake actuator position command, a throttle actuator position command, a torque command, a transmission gear ratio command, a fuel injection command, a final drive selection command, a cruise control speed setting command, and/or a requested speed command. In certain embodiments, the one or more output devices configured to receive the vehicle speed reference command 252 may include a dashboard device, a printer, a handheld or mobile device, a public datalink, a device in operative communication with a public datalink, a private datalink, a device in operative communication with a private datalink, a non-transient memory storage location, a non-transient memory buffer accessible to a datalink, a remote network, a device in operative communication with a remote network, and/or a like device capable of displaying an indication of the vehicle speed reference command 252.

A non-limiting example includes the speed reference determination module 250 configured to provide the vehicle speed reference command 252 to an output device which is a non-transient memory storage location. The vehicle speed reference command 252 is read from the non-transient memory storage location and utilized to adjust a speed reference for a vehicle, for example as a cruise control set speed adjustment.

Another non-limiting example includes the speed reference determination module 250 configured to provide the vehicle speed reference command 252 to an output device which is a public datalink, a device in operative communication with a public datalink, a private datalink, a device in operative communication with a private datalink, and/or a non-transient memory buffer accessible to a datalink. The vehicle speed reference command 252 is read from the datalink and/or the datalink buffer and provided to a location visible to a vehicle operator, such as a dashboard display or other visible location.

Yet another non-limiting example includes the speed reference determination module 250 configured to provide the vehicle speed reference command 252 to an output device which is a remote network and/or a device in operative communication with a remote network. The communication to the remote network may pass through intermediate communications, such as through a public or private datalink. The vehicle speed reference command 252 in the example is read from the remote network, and provided to a location visible to one of a vehicle operator and/or a fleet operator. An example includes a smart phone or mobile device providing the vehicle speed reference command 252 to the vehicle operator. Another example includes a remote device, such as a smart phone, laptop, desktop, or mobile device, providing the vehicle speed reference command 252 to the fleet operator. The fleet operator may adjust a vehicle speed reference, either remotely or in a calibration event at a later time—for example for vehicles that will be traveling on the route the current vehicle is traveling on, and/or the fleet operator may utilize the vehicle speed reference command 252 in future fleet planning operations. The described examples are non-limiting, and the inclusion of an example should not be considered to limit potential operations of devices or parameters that are either utilized in the examples or omitted from the examples.

Figure 3:
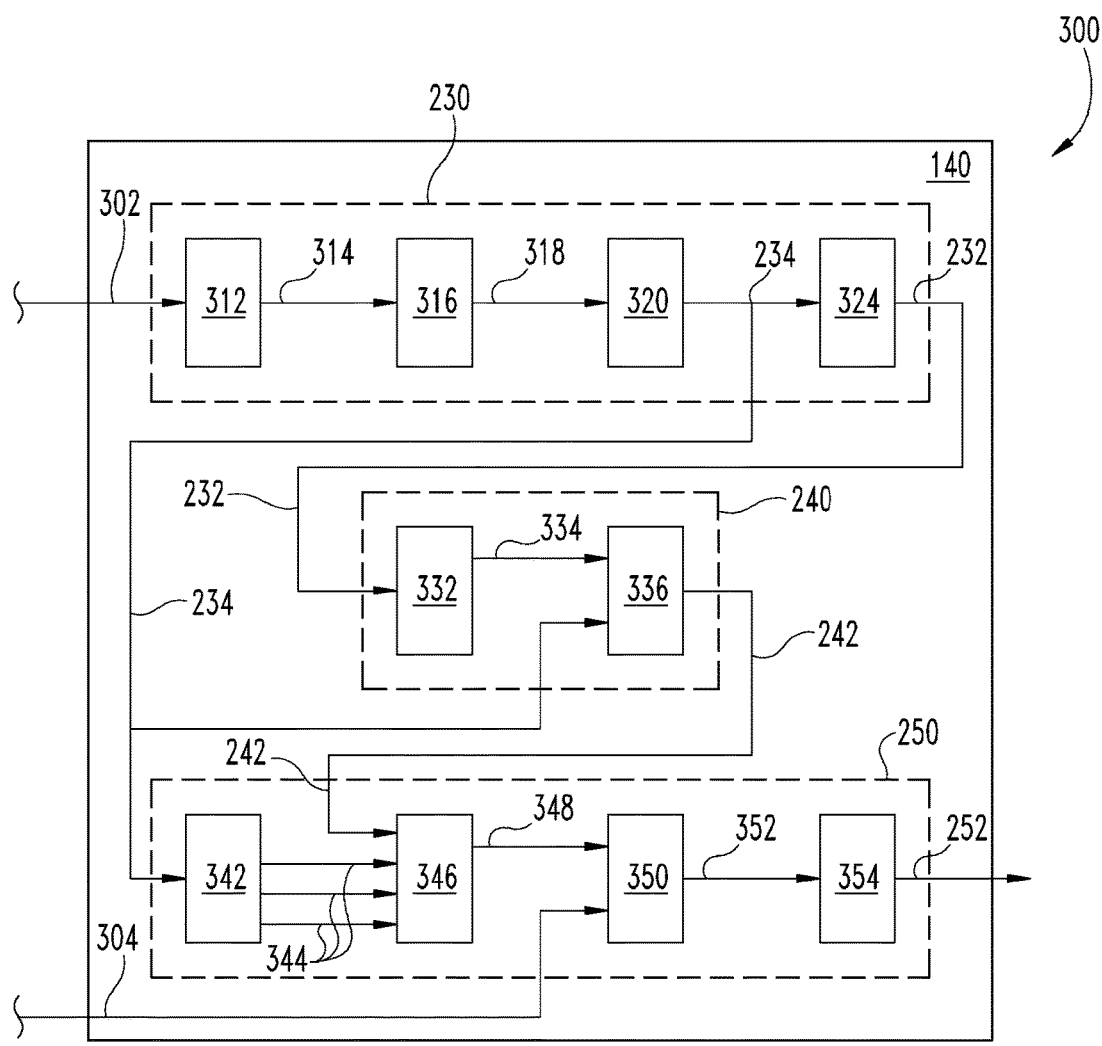
FIG. 3 is a schematic block diagram illustrating an example controller for determining a vehicle speed reference.

FIG. 3 illustrates another example embodiment 300 of the VSM controller 140. FIGS. 4-7 illustrate example embodiments of the input and output signals of the embodiment 300 to and from the VSM controller 140, respectively. With reference to FIG. 3, the VSM controller 140 receives a route grade signal 302 and a current velocity input 304.

Figure 4:
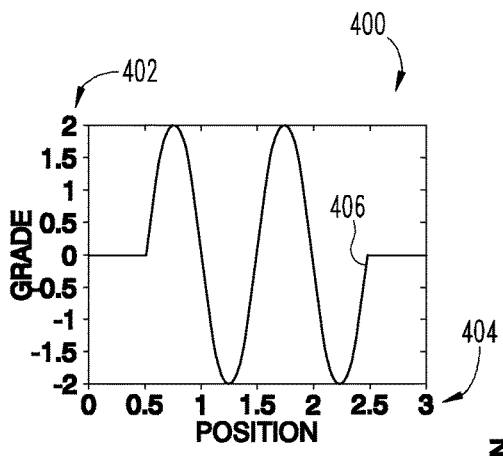
FIG. 4 is a line chart illustrating an example route grade signal input.

The route grade signal 302 is provided to the section grade and surface classification module 230. A non-limiting example of the route grade signal 302 is illustrated in FIG. 4. The route grade signal 302 may contain data for an entire route the vehicle will be travelling during a route trip. It is contemplated that in certain embodiments only a portion of the entire route may be provided to the section grade and surface classification module 230, with a different portion of the entire route being provided at different intervals throughout the route trip. In one non-limiting example, the route grade may be provided in two mile length increments. It is further contemplated that additional inputs may be received and interpreted by the section grade and surface classification module 230 in addition to or as an alternative to the route grade signal 302. Such signals may include an elevation signal, a route position signal, a speed limit signal, a traffic signal, signal indicating the proximity of adjacent vehicles, a wind signal, a road condition signal, a precipitation signal, an ambient pressure and/or temperature signal, a throttle position signal, a brake position signal, a fuel amount signal, an air/fuel ratio signal, an engine torque signal, and/or any derivative or second derivative of one of the signals which may be detected or calculated based on one or more sensors positioned throughout vehicle system 100.

In certain embodiments, the section grade and surface classification module 230 includes an elevation filtering module 312, a route grade sectioning module 316, a section grade averaging module 320, and a surface classification module 324. The elevation filtering module 312 outputs a filtered route grade 314 in response to the route grade signal 302 and a route grade filter. The filtered route grade 314 may be filtered by a zero phase shift low pass filter structured to reduce signal noise in the route grade. Different types of filters are contemplated, such as a high pass filter, a band pass filter, and a moving average filter, for example. It is further contemplated that other signals where noise is present in the signal may be filtered.

The route grade sectioning module 316 receives the filtered route grade 314 and sections of the filtered route grade 314 into a route sections output 318 based on the filtered route grade 314 and a section length, or resolution. In one non-limiting example, where the route grade provided is two miles in length and the section length is one-tenth of a mile, the route sections output 318 would be comprised of twenty route sections, each having a section grade and a length of one-tenth of a mile.

The section grade averaging module 320 receives the route sections output 318 and determines the average grade 234 based on each section grade of the route sections output 318 and the total number of route sections included in route sections output 318.

Figure 5:
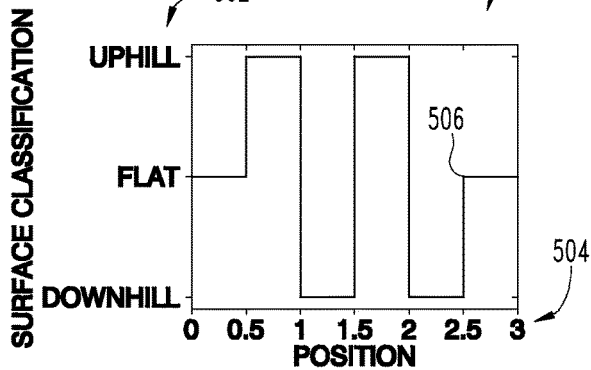
FIG. 5 is a line chart illustrating an example surface classification based on the route grade signal input of FIG. 4.

The surface classification module 324 receives the average grade 234 and determines a surface classification 232 for each route section. One non-limiting example of the surface classification 232 is illustrated in FIG. 5. An example surface classification module 324 determines the surface classification 232 for each route section based on each section grade and a classification threshold for each classification. In certain embodiments, each route section may be classified as one of the following surface classifications: an uphill surface, a downhill surface, and a flat surface. In one example non-limiting embodiment, the classification threshold may be a grade percentage. For example, when the section grade has a positive grade greater than an uphill surface percentage threshold, the route section may be classified as the uphill surface, when the section grade has a negative grade less than a downhill surface percentage threshold, the route section may be classified as the downhill surface, and when the section grade has a positive grade less than or equal to uphill surface percentage threshold or a negative grade greater than or equal to the downhill surface percentage threshold, the route section may be classified as the flat surface. In certain embodiments, it is contemplated that other thresholds may be used in addition to and/or alternatively to the grade percentage classification threshold, such as a hysteresis based threshold defined as a function of the current state, and/or determining a threshold using a search heuristic, such as a genetic algorithm, and/or adaptive control logic.

In certain embodiments, the speed mode determination module 240 includes a mode identification module 332 and a mode identification adjustment module 336. The mode selection system is provided the average grade 234 and the surface classification 232. The mode identification module 332 receives the surface classification 232 and determines a speed mode output 334 for each route section based on the surface classification 232. In certain embodiments, the speed mode output 334 may be based on a lookup table as a function of a current route section and a next route section. In certain embodiments, the current route section may be the route section from the route sections in which the vehicle is currently travelling in and the next route section may be the route section from the route sections in which the vehicle will be travelling in immediately following the current route section. An example mode identification module 332 may identify each route section as being one of a cruise mode (i.e., return to or maintain cruise speed set point), a pre-uphill speedup mode (i.e., speed up before entering the upcoming hill), a pre-downhill slowdown mode (i.e., slow down before entering the upcoming downhill), In certain embodiments, it is contemplated that one or more additional modes may be used by the example mode identification module 332 to identify each route section, such as a no speed change mode and/or a coast mode, for example.

The mode identification adjustment module 336 receives the average grade 234 and the speed mode output 334 as inputs to determine and output the vehicle speed mode 242 to allow for a pre-hill adjustment length, which may be applied to each route section. In certain embodiments, the vehicle speed mode 242 may be based on a lookup table as a function of the current route section and the next route section, an example of which is further detailed in FIG. 8.

The current velocity input 304 is provided to the speed reference determination module 250. In the illustrated embodiment, the speed reference determination module 250 includes a speed mode selector module 346, a speed reference determination module 350, and a speed reference determination module 354. The speed reference determination module 250 further includes a piecewise linear parameter module 342 that receives the surface classification 232 for each route section and determines a speed modes output 344 for each route section based on the surface classification 232 for each route section. In certain embodiments, a piecewise linear function of route section distance and route section amplitude may be used to determine the speed mode for each route section. It is contemplated that in certain embodiments a nonlinear function, a polynomial function, an exponential function, a logarithmic function, a trigonometric function, a spline function, a constant function, and/or the like may be used in addition to and/or as an alternative to the piecewise linear function.

The speed mode selector module 346 receives the vehicle speed mode 242 and the speed modes output 344 to determine a current speed mode output 348 for the current route section. The current velocity input 304 and current speed mode output 348 are received by the speed reference determination module 350, which determines a speed reference output 352. In certain embodiments, speed reference output 352 may be determined utilizing the following equation:

$$V(i+1)=V(i)+a*dx \qquad \text{Equation 1}$$

wherein V is the velocity and a is the rate of change velocity with respect to distance. It is contemplated that the velocity values used in Equation 1 may be measured, calculated, and/or modeled. In certain embodiments, the average grade 234 may be used to further determine speed reference output 352.

The speed reference adjustment module 354 receives the speed reference output 352 and determines the vehicle speed reference command 252. The vehicle speed reference command 252 may include one or more vehicle speed references sent to one or more components of vehicle system 100. In one example, the vehicle speed reference command 252 may be a brake actuator position for a brake actuator in a braking system. Other non-limiting examples include a throttle actuator position, a transmission gear ratio, a final drive selection, a cruise control set point, a fueling command, a torque request, and/or a requested speed. The vehicle speed reference command 252 may be determined using an output limiting threshold, such as a rate limiting threshold and/or saturation threshold, for example.

Figure 6:
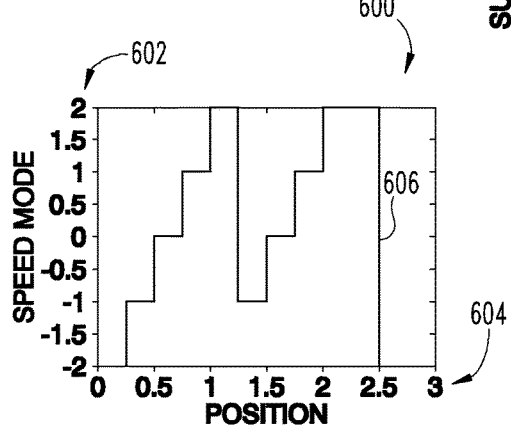
FIG. 6 is a line chart illustrating an example speed mode based on the surface classification of FIG. 5.
Figure 7:
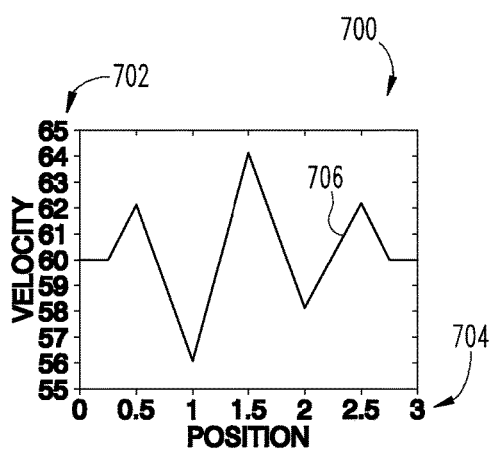
FIG. 7 is a line chart illustrating an example velocity based on the speed mode of FIG. 6.

As noted previous, FIGS. 4-7 illustrate example embodiments of the input and output signals of the embodiment 300 of the VSM controller 140. FIG. 4 illustrates a route grade line chart 400 having a grade variable Y-axis 402, a position variable X-axis 404, and a route grade signal 406. FIG. 5 illustrates a surface classification line chart 500 having a surface classification variable Y-axis 502, a position variable X-axis 504, and a surface classification signal 506. FIG. 6 illustrates a speed mode line chart 600 having a speed mode variable Y-axis 602, a position variable X-axis 604, and a speed mode signal 606. FIG. 7 illustrates a reference velocity line chart 700 having a velocity variable Y-axis 702, a position variable X-axis 704, and a reference velocity signal 706.

Figure 8:
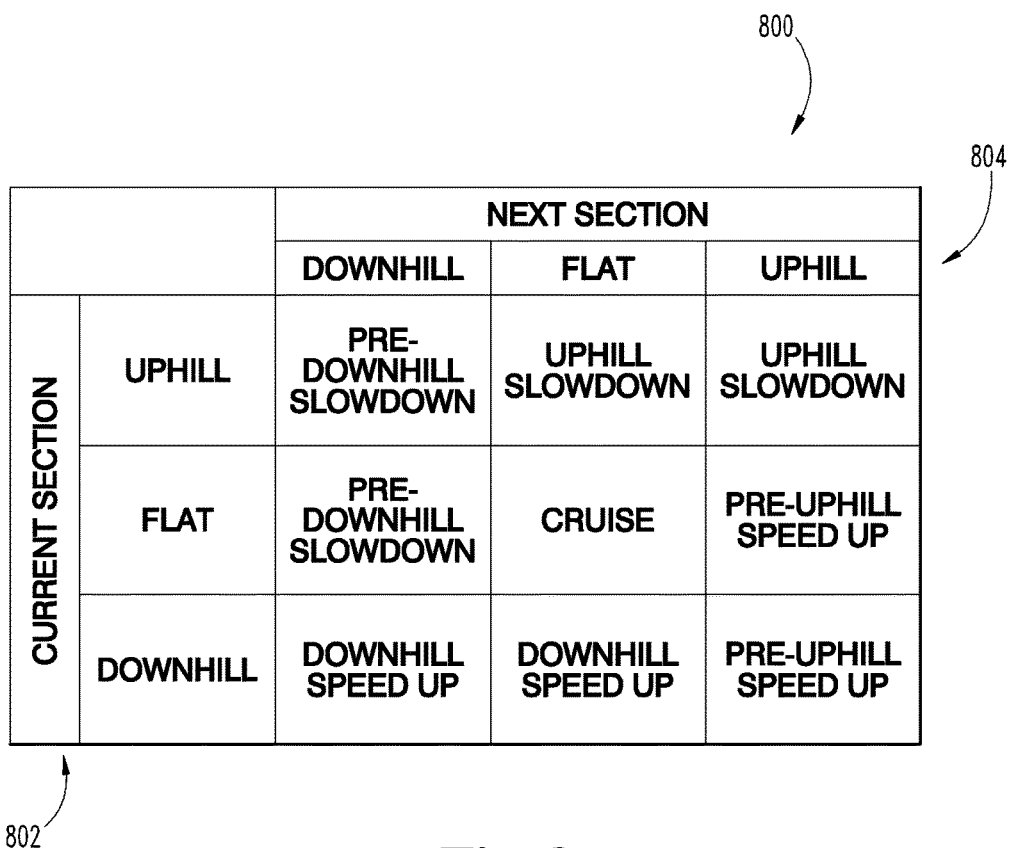
FIG. 8 is an example speed mode lookup table.

FIG. 8 illustrates an example speed mode lookup table 800 as a function of a current route section axis 802 and a next route section axis 804. Each route section axis 802, 804 includes each surface classification for mapping a current speed mode based on the current route section and the next route section. For example, when the current route section is classified as an uphill surface and the next route section is classified as a downhill surface, the current speed mode would be set to the pre-downhill slowdown mode. It is contemplated that different surface classifications and/or speed modes may be used in addition to or as an alternative to the surface classifications and speed modes illustrated in FIG. 8, in which case the speed mode lookup table axes 802, 804 may be modified to reflect the different surface classifications and/or speed modes.

Figure 9:
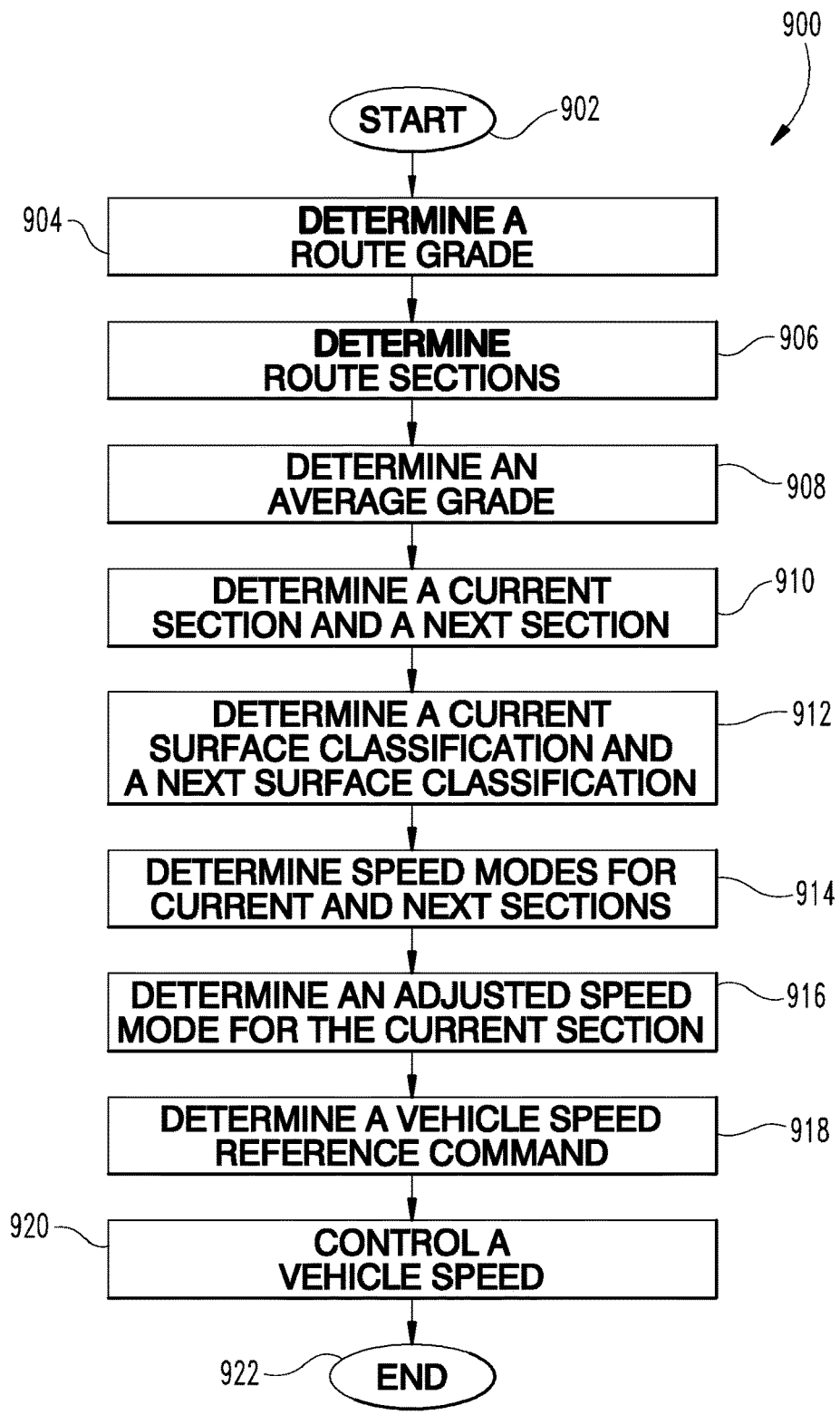
FIG. 9 is a flow diagram illustrating an example procedure for determining a vehicle speed reference.

With reference to FIG. 9, there is illustrated a flow diagram of an example procedure 900 for determining a vehicle speed reference. In certain embodiments the vehicle speed reference may be provided to a vehicle system, such as vehicle system 100, to control a vehicle speed for a vehicle in that is put into operation by programming the VSM controller 140 for use in, for example, vehicle system 100. In certain embodiments, the example procedure 900 may be used to control the vehicle speed of a vehicle operating in an active cruise control mode. In addition to or as an alternative to providing the vehicle speed reference to the vehicle system to control the vehicle speed, it is contemplated that in certain embodiments the vehicle speed reference may be provided to an output device for displaying an indication of the vehicle speed reference. Such output devices may include a dashboard device, a printer, a hand-held or mobile device, a public datalink, a device in operative communication with a public datalink, a private datalink, a device in operative communication with a private datalink, a non-transient memory storage location, a non-transient memory buffer accessible to a datalink, a remote network, a device in operative communication with a remote network, and/or a like device capable of displaying an indication of the vehicle speed reference. Procedure 900 begins at operation 902, in which a control routine is started for providing a route grade signal to VSM controller 140 to determine the vehicle speed reference. Operation 902 may begin by interpreting a key-on event, completion of a cycle, restarting procedure 900, or by initiation by the vehicle operator or a technician.

Procedure 900 continues to operation 904, where a route grade is determined based on the route grade signal. It is contemplated that in certain embodiments, the route grade may be for the entire route or a portion of the route. It is further contemplated that the route grade signal may be filtered, such as by a low pass filter, for example. Procedure 900 continues from operation 904 to operation 906, where route sections are determined based on the route grade signal and a route section length. It is contemplated that in certain embodiments the route section length may be a static length defined at the beginning of the route and/or a dynamic length that may be redefined throughout the route. Procedure 900 continues to operation 908, where an average grade is determined based on the route grade and the route section length. In certain embodiments a simple averaging function may be used. It is contemplated that in certain embodiments the average grade function may only use a portion of the route grade.

From operation 908, procedure 900 continues to procedure 910, where a current section and a next section are determined from the route sections determined at operation 906. Procedure 900 continues to operation 912, where each of the current and next sections are classified with a surface classification. It is contemplated that in certain embodiments a threshold may be used to reduce/remove signal chattering, or signal deviations, to determine the surface classification. In certain embodiments, the surface classification may include one of an uphill surface, a downhill surface, and/or a flat surface. Procedure 900 continues from operation 912 to operation 914, where a speed mode is determined for each of the current and next sections based on the surface classification for each section determined in operation 912. The speed mode for each section may be determined using a lookup table as a function of the current section surface classification and the next section surface classification. In certain embodiments the speed mode may include a cruise mode, a pre-uphill speedup mode, an uphill slowdown mode, a pre-downhill slowdown mode, and/or a downhill speedup mode.

From operation 914, procedure 900 continues to operation 916, where an adjusted speed mode for the current section is determined based on the current and next section speed modes determined in operation 914. Procedure 900 then continues to operation 918, where a vehicle speed reference command is determined. In certain embodiment, the vehicle speed reference command may be determined as a function of the current velocity, the average grade, and the current speed mode. Procedure 900 continues from operation 918 to operation 920, where a vehicle speed is controlled based on the vehicle speed reference command determined at operation 918. In certain embodiments, the vehicle speed reference command may include one or more vehicle speed reference commands sent to the ECU 130, another controller, and/or directly to one or more speed control components of vehicle system 100. The speed control components may include a brake actuator, a throttle actuator, a fuel injector, a transmission gear, a final drive, a cruise control system, and/or an engine request directed toward engine torque, for example. Procedure 900 is complete and ends at operation 922, where procedure 900 may be restarted such that the section after the next route section becomes the next route section and the previous next route section becomes the current route section. Procedure 900 may be repeated for the entire route grade signal.

Additionally and/or alternatively to the embodiments above, a cruise speed controller 1000 can be provided that in some forms is the VSM controller 140 and/or is a supplemental controller to a conventional cruise controller. The cruise speed controller 1000 can be structured to receive inputs such as the embodiment 200 depicted above in FIG. 2, as well as any number of other inputs, and output a control signal useful in the regulation of vehicle speed.

Figure 10A:
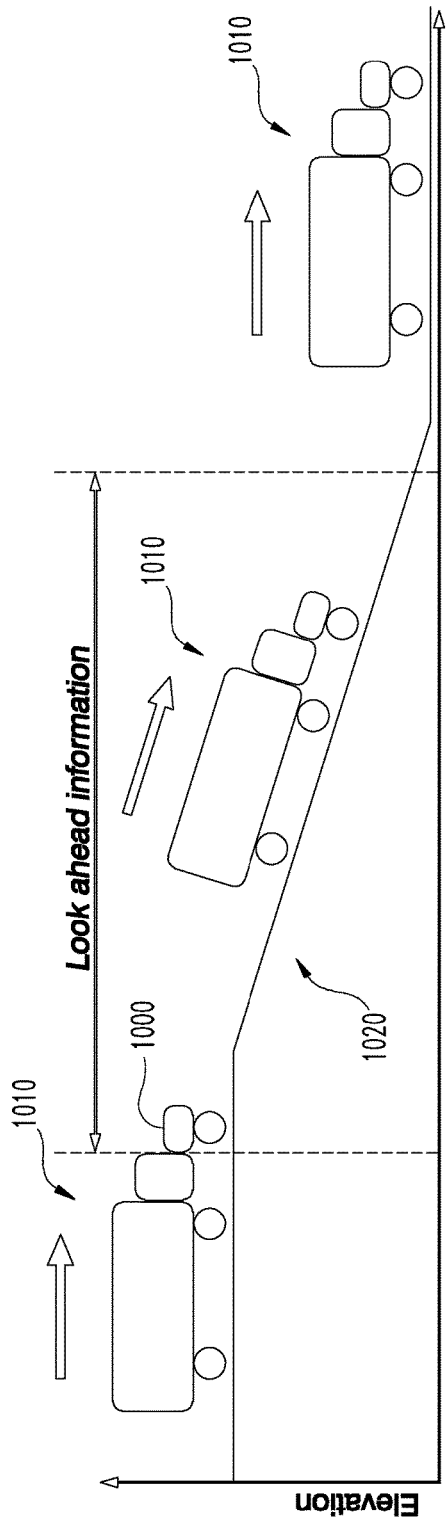
FIGS. 10a and 10b depict an embodiment of a cruise speed controller regulating speed of a vehicle.
Figure 10B:
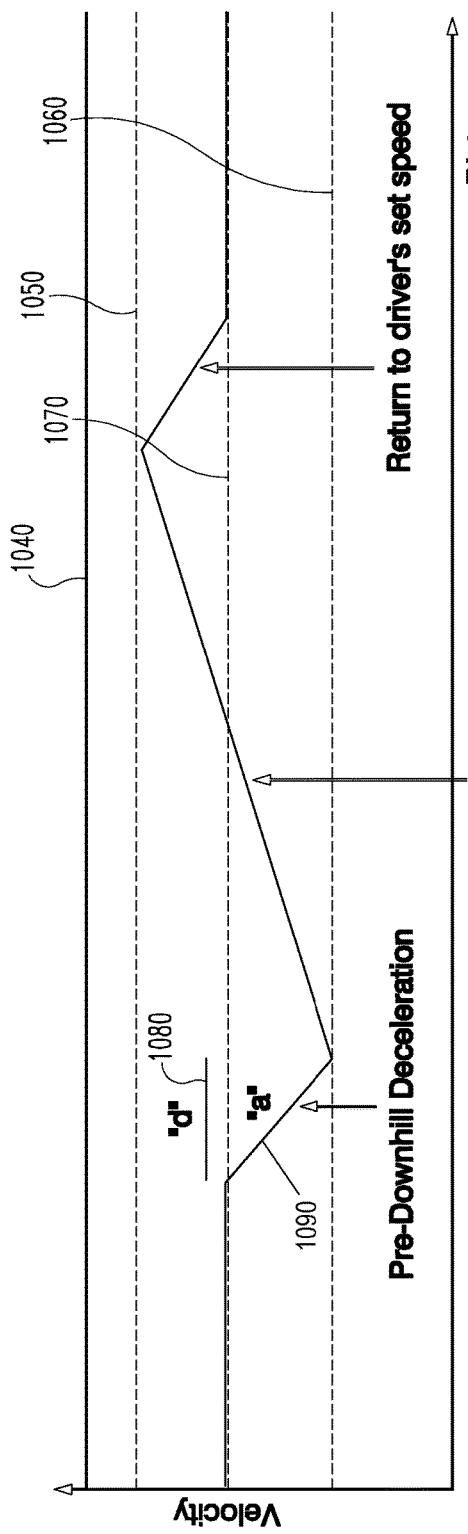

Turning now to FIGS. 10*a* and 10*b*, one embodiment of the cruise speed controller 1000 can be seen pictorially regulating the speed of a vehicle 1010 (which in some forms can be the same as vehicle system 100) as it descends a grade 1020 in a road. FIG. 10*a* depicts the vehicle at three separate locations during its travel: at the top the grade, on the grade, and at the bottom of the grade. FIG. 10*b* depicts various velocity related details of the vehicle movement plotted as a function of distance. The velocity related details include items such as: engine brake activation speed 1040, a speed control "droop upper bound" 1050 which relates to an upper speed at which in one embodiment the velocity control system will disengage if exceeded, a speed control "droop lower bound" 1060 which relates to a lower speed at which in one embodiment the velocity control system will disengage if exceeded, and a set speed 1070 which relates to a constant speed at which the vehicle will be regulated during engagement of the cruise control.

The cruise speed controller 1000 can regulate speed according to a commanded value in a number of different manners. For example, the commanded value of speed can be a cruise reference speed which represents a command formed by the combination of a set speed along with an offset speed (either positive or negative) which is used as the effective commanded speed used in the control regulation of vehicle speed. In this way, the set speed can be a constant during operation of the cruise speed controller 1000 and in which the offset is used to achieve a desired time varying velocity profile. In alternative embodiments the cruise reference speed can be a time varying parameter which is substituted in place of the set speed. In such embodiments the cruise speed controller 1000 can be structured to suppress a control reaction to a growing error between set speed and vehicle speed during operation of the pre-hill capabilities depicted in FIGS. 10a and 10b, and instead regulate to an error between vehicle speed and the cruise reference speed which is substituted in place of the set speed.

As suggested in the figure, at a distance "d" 1080 in advance of the grade 1020, the cruise reference speed begins a reduction in regulated velocity toward the droop lower bound 1060 which causes a resultant downward trend in vehicle velocity. The cruise reference speed can follow a deceleration profile "a" 1090 as depicted in FIG. 10 which is illustrated as a straight line change occurring over a distance "d".

It is contemplated in some embodiments that the end of the distance "d" coincides with the beginning of a grade change such as that shown in FIG. 10, but in other embodiments the distance "d" is merely an effective distance in advance of a sufficiently steep grade to change the velocity profile. In this way the grade of the terrain at one or more points along the distance "d" 1080 may not be strictly level ground, but that points following distance "d" 1080 are of sufficiently high magnitude of grade to cause vehicle acceleration anticipated by the control system that results in vehicle speed increasing toward the droop upper bound 1050.

Although the resultant velocity change as a consequence of following the profile "a" 1090 is shown in the figure as achieving the droop lower bound 1060 at the end of the distance "d" 1080, in some embodiments the resultant velocity change may not be exactly at the droop lower bound 1060 when the vehicle begins its descent of the grade 1020.

After following the velocity profile "a" 1090, vehicle speed will begin to increase during this time from a point near or at the droop lower bound 1060 and increasing upward toward the droop upper bound 1050, either in a fashion that follows a natural increase in vehicle speed as a result of coasting (e.g. inadequate cruise control performance to maintain set speed), or in a fashion of controlled acceleration via a change in the cruise reference speed (e.g. a constant change of velocity, either measured with respect to time or distance as depicted in the figure), among other possibilities. Once the vehicle approaches/reaches the end of the grade and/or the droop upper bound 1050, vehicle speed can be returned to the original set speed, either through a natural change in speed of the vehicle (e.g. a return to set speed through normal cruise control regulation) at the end of the grade 1020, or through a controlled change in velocity such as through a change in cruise reference speed, among other possibilities. In this way the pre-hill control methodology of a change in speed "a" 1090 over the distance "d" 1080 shown in FIGS. 10a and 10b can create a cruise reference speed different from set speed only during the pre-hill regulation period, but in some forms the formulation of cruise reference speed and resultant regulation to that variable can extend past the distance "d" 1080 if desired.

Figure 11A:
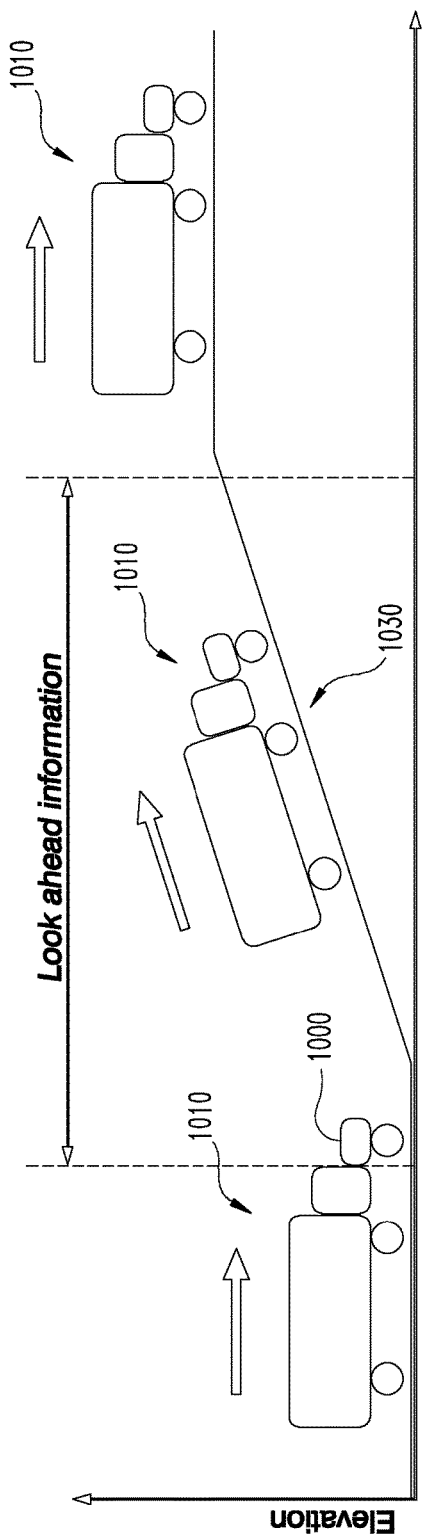
FIGS. 11a and 11b depict another embodiment regulating speed of a vehicle.
Figure 11B:
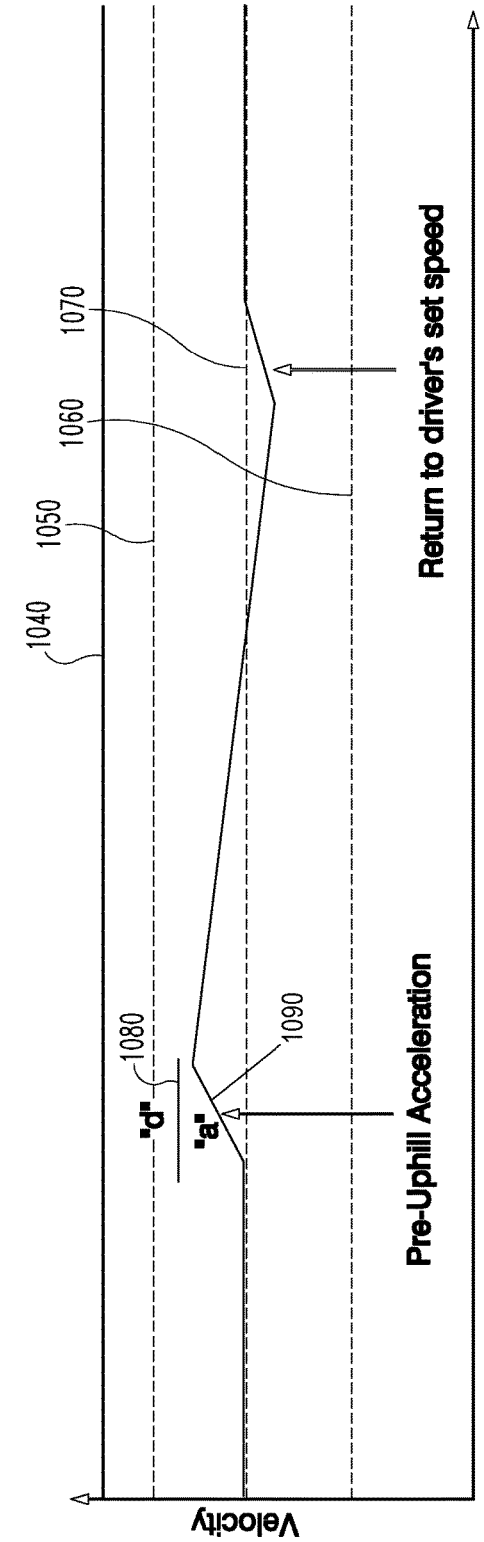

FIGS. 11a and 11b depict an alternative and/or additional capability of the cruise speed controller 1000 from that depicted in FIG. 10. FIGS. 11a and 11b depict an embodiment of the cruise speed controller 1000 which can be seen pictorially regulating the speed of a vehicle 1010 as it ascends a grade 1020 in a road. FIG. 11a depicts the vehicle at three separate locations during its travel: at the bottom of the grade, on the grade, and at the top of the grade. FIG. 11b depicts various velocity related details of the vehicle movement plotted as a function of distance. The velocity related details include items such as: engine brake activation speed 1040, a speed control "droop upper bound" 1050 which relates to an upper speed at which in one embodiment the velocity control system will disengage if exceeded, a speed control "droop lower bound" 1060 which relates to a lower speed at which in one embodiment the velocity control system will disengage if exceeded, and a set speed 1070 which relates to a constant speed at which the vehicle will be regulated during engagement of the cruise control.

As in the example above with respect to FIGS. 10a and 10b, the cruise speed controller 1000 can regulate speed according to a commanded value in a number of different manners. For example, the commanded value of speed can be a cruise reference speed which represents a command formed by the combination of a set speed along with an offset speed (either positive or negative) which is used as the effective commanded speed used in the control regulation of vehicle speed. In this way, the set speed can be a constant during operation of the cruise speed controller 1000 and in which the offset is used to achieve a desired time varying velocity profile. In alternative embodiments the cruise reference speed can be a time varying parameter which is substituted in place of the set speed. In such embodiments the cruise speed controller 1000 can be structured to suppress a control reaction to a growing error between set speed and vehicle speed during operation of the pre-hill capabilities depicted in FIGS. 11a and 11b, and instead regulate to an error between vehicle speed and the cruise reference speed which is substituted in place of the set speed.

As suggested in the figures, at a distance "d" 1080 in advance of the grade 1030, the cruise reference speed begins an increase in regulated velocity toward the droop upper bound 1050 which causes a resultant upward trend in vehicle velocity. The cruise reference speed can follow an acceleration profile "a" 1090 as depicted in FIG. 10b which is illustrated as a straight line change occurring over a distance "d".

It is contemplated in some embodiments that the end of the distance "d" coincides with the beginning of a grade change such as that shown in FIG. 10, but in other embodiments the distance "d" is merely an effective distance in advance of a sufficiently steep grade. In this way the grade of the terrain at one or more points along the distance "d" 1080 may not be strictly level ground, but that points following distance "d" 1080 are of sufficiently high grade change to cause vehicle deceleration anticipated by the control system that results in vehicle speed decreasing toward the droop lower bound 1060.

Although the resultant velocity change as a consequence of following the profile "a" 1090 is shown in the figure as failing to achieve the droop upper bound 1050 at the end of the distance "d" 1080, in some embodiments the resultant velocity change may achieve the droop upper bound 1050 when the vehicle begins its ascent of the grade 1030.

After following the velocity profile "a" 1090, vehicle speed will begin to decrease during this time from a point above the set speed and decreasing downward toward the droop lower bound 1060, either in a fashion that follows a natural decrease in vehicle speed as a result of a burdened hill climb (e.g. inadequate cruise control performance to maintain set speed), or in a fashion of controlled deceleration via a change in the cruise reference speed (e.g. a constant change of velocity, either measured with respect to time or distance as depicted in the figure), among other possibilities. Once the vehicle approaches/reaches the end of the grade and/or below the set speed such as near the droop lower bound 1060, vehicle speed can be returned to the original set speed, either through a natural change in speed of the vehicle (e.g. a return to set speed through normal cruise control regulation) at the end of the grade 1030, or through a controlled change in velocity such as through a change in cruise reference speed, among other possibilities. In this way the pre-hill control methodology of a change in speed "a" 1090 over the distance "d" 1080 shown in FIGS. 11a and 11b can create a cruise reference speed different from set speed only during the pre-hill regulation period, but in some forms the formulation of cruise reference speed and resultant regulation to that variable can extend past the distance "d" 1080 if desired.

Figure 12:
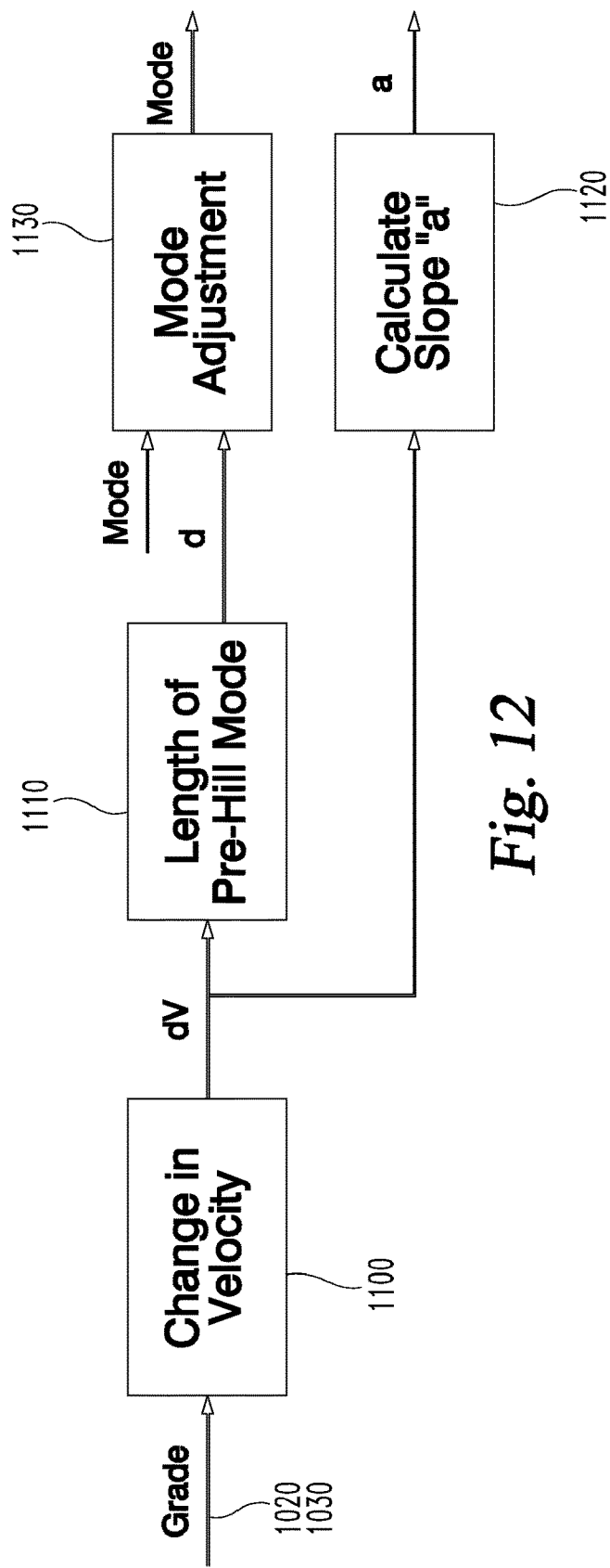
FIG. 12 depicts a block diagram of a pre-hill methodology.

Turning now to FIG. 12, one implementation of either or both the pre-hill methodologies shown in FIGS. 10a, 10b, 11a, and 11b is shown in block diagram form. A grade of the upcoming terrain (whether uphill like grade 1020 or downhill like grade 1030) is provided to a speed change procedure 1100 that is used to compute a change in speed of the vehicle as a result of a grade in the terrain upon which the vehicle is travelling. The grade of the upcoming terrain can in some forms be continuously updated in the controller as the vehicle travels upon the terrain. Such data can be provided via on-board memory calls, RF reception, electronic bus communications, inter-vehicle/server network communication, etc. The grade data can take any variety of forms. For example, the grade data can be a look ahead vector in which each data point in the vector corresponds to a data point in a position vector (e.g. the position vector can represent evenly spaced data points at distance intervals in advance of the vehicle). Such a pairing of grade and position vectors could represent a constantly updated data set as the vehicle travels along a road with both vectors representing look-ahead information. Not all datasets need include evenly spaced position data points.

The speed change procedure 1100 can be a physics based model of vehicle performance and is structured to produce a speed change of the vehicle denoted as dV. In one form the speed change module uses information such as power available from the engine, vehicle speed, vehicle mass, etc to predict a change in vehicle speed as a result of the grade. In one nonlimiting embodiment the change in speed can be represented as:

$$dV = (P_{eng} - P_{ss,cruise} - P_{grade}) \frac{L}{m \cdot v^2}$$

Where dV represents the change in speed; $P_{eng}$ represents either the motoring power or the max power of the engine depending upon whether the grade is negative or positive; $P_{ss,cruise}$ represents the power required for the vehicle to maintain steady cruise set speed; L is the length of the grade segment, m is the mass of the vehicle, and v is vehicle speed; and $P_{grade}$ is the grade power (e.g. m*g*sin(grade angle)*v where the symbols are the same as elsewhere in the equation and g is gravity).

The output dV of the speed change procedure 1100 is provided to a Length of Pre-Hill Mode procedure 1110 that determines the distance "d" 1080. The output dV is also provided to a Slope module 1120 that calculates the slope "a" 1090, more of which is discussed below. The procedure 1110 can determine the distance "d" 1080 as a function of the projected speed change dV, but in some forms the distance "d" 1080 can be a pre-set number that is determined by the procedure 1110 such as through memory calls, RF transmission, electronic bus communication, inter-vehicle/server network communication, etc. In one nonlimiting example the distance "d" 1080 can be calculated through a regression function such as d=C1+C2*dV, where C1 and C2 are constants, the values of which can be determined in similar fashion as to the situations in which "d" 1080 is pre-set. Such linear regression functions need not be the only type of function used to calculate distance "d" 1080. In some nonlimiting forms C2 can be set to zero in which case the distance "d" 1080 is calculated as a constant.

As mentioned above, the output dV of the speed change procedure 1100 is also provided to a Slope Module procedure 1120 that determines the slope "a" 1090. The procedure 1120 can determine the slope "a" 1090 as a function of the projected speed change dV, but in some forms the slope "a" 1090 can be a pre-set number that is determined by the procedure 1120 such as through memory calls, RF transmission, electronic bus communication, inter-vehicle/server network communication, etc. In one nonlimiting example the slope "a" 1090 can be calculated through a regression function such as a=C3+C4*dV, where C3 and C4 are constants, the values of which can be made available in similar fashion as to the situations in which "a" 1090 is pre-set. Such linear regression functions need not be the only type of function used to calculate the slope "a" 1090. In some nonlimiting forms C4 can be set to zero in which case the slope "a" 1090 is calculated as a constant.

The constants C1, C2, C3, and C4, and for that matter the distance "d" when it is a pre-set value, can be determined through any variety of techniques which will be understood by those in the art. For example, the constants C1 and C2 can be determined through a study of typical terrain features over a given route, and the values selected to satisfy performance expectations over the terrain. Such a situation may entail study of a typical route having, say, three separate uphill grade features of known lengths, with a typical mass of vehicle expected speed profile, and then selecting C1 and C2 to fit the performance of the vehicle within the chart depicted in FIG. 10b. Other techniques include a Design of Experiments (DOE) technique in which a multitude of simulations are conducted over a variety of route features and then selecting a regression function over the experiments that satisfy performance criteria.

The cruise speed controller 1000 is configured to take action and formulate/set cruise reference speed with respect to slope "a" 1090 and distance "d" when the change in speed dV predicted by procedure 1100 satisfies a threshold inequality condition. Furthermore, the threshold to initiate the control actions described in the slope "a" and distance "d" can be accomplished in a number of different manners. The cruise speed controller 1000 can initiate the change in reference cruise speed when dV reaches a threshold, among other possibilities. For example, when dV is at or above a threshold the pre-hill control action sequence can begin immediately. In some forms the controller will only initiate a change in reference cruise speed upon satisfying multiple conditions, such as when dV reaches a threshold (condition 1) and when the vehicle reaches the distance "d" 1080 in advance of a grade (condition 2). Such threshold inequalities for either dV or "d" can be satisfied when the conditions are equal to the threshold, equal or greater than the threshold, equal or less than the threshold, greater than the threshold, or less than to the threshold, as will be appreciated in the art. For example, when traversing terrain that is predicted to produce an increase in speed, the threshold condition for dV can be equal to or greater than the threshold, equal to the threshold, or greater than the threshold. The reverse applies to rising terrain in which a reduction in vehicle speed is predicted.

The mode of the control system can also be updated via the mode adjustment procedure 1130. In those implementations in which the cruise speed controller 1000 is or is implemented in the VSM controller 140, the mode of the control system can be changed to reflect the pre-hill control actions described above with respect to the determinations of slope "a" 1090 and distance "d" 1080, along with the change in velocity profile of each. For example, in addition to and/or alternative to the description mentioned above, the speed mode determination module 240 may determine the current road conditions as being one of a cruise speed mode (i.e., return to or maintain a cruise speed that may be defined by the operator of the vehicle), a pre-uphill speedup speed mode (i.e., speed up before entering an upcoming uphill surface), and a pre-downhill slowdown speed mode (i.e., slow down before entering an upcoming downhill surface. In some applications that mode determined by the speed mode determination module 240 can be replaced via action of the Mode Adjustment procedure 1130 to reflect being in the pre-uphill speedup speed mode, or the pre-downhill slowdown mode. The updated mode is then provided by the Mode Adjustment procedure 1130.

One aspect of the present application includes a method comprising operating a vehicle having a powertrain and a vehicle speed controller structured to regulate a speed of the vehicle, the vehicle speed controller being engaged during the operating at a cruise reference speed to regulate the speed of the vehicle, computationally predicting a speed change of the vehicle as a result of an upcoming terrain grade of a throughway upon which the vehicle is travelling, and at an initiation distance in advance of the upcoming terrain grade, automatically initiating a change in speed of the vehicle while the speed controller is engaged.

A feature of the present application provides wherein the vehicle speed controller includes a cruise control structured to regulate vehicle speed about a reference speed, wherein the initiation distance is a constant and wherein the change in speed is a constant rate of change of velocity with respect to distance Another feature of the present application provides wherein the predicted speed change is based upon a performance model of the vehicle structured to predict change in velocity in light of a look ahead window of the upcoming terrain grade upon which the vehicle is predicted to traverse.

Yet another feature of the present application further includes wherein the reference speed is computed by adding a delta command to an operator set speed and regulating vehicle speed to the summation of set speed and the delta command, wherein the delta command is time varying.

Still another feature of the present application further includes modifying a controller mode signal to reflect the automatically initiating a speed change in the vehicle.

Still yet another feature of the present application provides wherein the automatically initiating a change in speed of the vehicle occurring only upon satisfying an inequality that compares the computationally predicted speed change of the vehicle with a threshold speed change.

A further feature of the present application further includes computing the initiation distance and the change in speed while the speed controller is engaged, where the initiation distance is calculated according to vehicle regression as a function of speed change.

Another aspect of the present application provides an apparatus comprising a speed based controller for a vehicle having propulsive engine, the speed based controller structured to: retain a commanded speed in the form of an operator set speed of the speed based controller to which speed of the vehicle will be regulated, estimate a change in speed of the vehicle in light of upcoming terrain, and trigger a change in commanded speed of the vehicle when the estimated change in speed of the vehicle satisfies a threshold inequality condition.

A feature of the present application provides wherein the change in commanded speed is accomplished by substituting the operator set speed with a reference speed representative of the change in commanded speed of the vehicle, and wherein an operator's set speed is stored in memory of the speed based controller and is established by a query to electronic memory.

Another feature of the present application provides wherein the substitution is accomplished by adding a delta speed to the reference speed, the delta speed representative of a desired change of speed from the reference speed.

Yet another feature of the present application provides wherein the delta speed is calculated according to the formula $V(i+1)=V(i)+a*dx$ where 'i' represents an index to velocity at a distance position 'i', 'a' is a rate of change of velocity with respect to distance, and dx is the distance traveled by the vehicle between distance points 'i' and 'i+1'

Still another feature of the present application provides wherein the rate of change in speed 'a' is determined according to a regression as a function of the speed change.

Yet still another feature of the present application provides wherein the change in speed estimated by the controller is based upon a performance model of the vehicle structured to predict change in velocity in light of a change in grade of terrain upon which the vehicle is predicted to traverse.

Still yet another feature of the present application provides wherein the change in commanded speed of the vehicle is triggered when the change in speed estimated by the controller satisfies an inequality conditional relative to a threshold change in speed.

Yet another aspect of the present application provides an apparatus comprising a vehicle having a propulsive engine and a vehicle cruise control system configured to regulate operation of the engine by increasing or decreasing power to the driveline, the control system having a physics based estimator structured to predict a speed change of the vehicle in light of upcoming terrain data, the control system structured to change speed of the vehicle over a predetermined distance in advance of the terrain data that gives rise to the speed change of the vehicle.

A feature of the present application provides wherein the predetermined distance is calculated based upon the predicted speed change of the vehicle.

Another feature of the present application provides wherein the change in speed and the fixed distance are constants stored in electronic memory.

Still another feature of the present application provides wherein the terrain data is a discretized set of data points representative of terrain.

Still yet another feature of the present application provides wherein the data points representative of terrain are values that represent terrain grade at an upcoming position relative to the vehicle position.

Yet still another feature of the present application provides wherein the data points are distributed at defined intervals, wherein the change in speed over a distance interval is accomplished by adjusting set speed of the cruise control system.

A further feature of the present application provides wherein a mode of the control system is altered when the control system triggers a change in speed of the vehicle, the mode to which the control system is altered including one of a pre-uphill speed up mode, and a pre-downhill slow down mode.

It should be understood that while the use of words such as preferable, preferably, preferred or more preferred if utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
    operating a vehicle having a powertrain and a vehicle speed controller structured to regulate a speed of the vehicle, the vehicle speed controller being engaged during the operating at a cruise reference speed to regulate the speed of the vehicle;
    calculating a predicted speed change of the vehicle as a result of an upcoming terrain grade of a throughway upon which the vehicle is travelling; and
    at an initiation distance in advance of the upcoming terrain grade, automatically initiating a change in speed of the vehicle based on the predicted speed change while the speed controller is engaged.

2. The method of claim 1, wherein the vehicle speed controller includes a cruise control structured to regulate vehicle speed about a reference speed, wherein the initiation distance is a constant and wherein the change in speed is a constant rate of change of velocity with respect to distance.

3. The method of claim 1, wherein the predicted speed change is based upon a performance model of the vehicle structured to predict change in velocity in light of a look ahead window of the upcoming terrain grade upon which the vehicle is predicted to traverse, wherein the performance model includes a motoring power or a maximum power of the engine depending upon whether the upcoming terrain grade is negative or positive, a power required for the vehicle to maintain a steady cruise set speed, a length of the grade segment, a mass and the speed of the vehicle, and a grade power.

4. The method of claim 3, wherein the reference speed is computed by adding a delta command to an operator set speed and regulating vehicle speed to the summation of set speed and the delta command, wherein the delta command is time varying.

5. The method of claim 1, which further includes modifying a controller mode signal to reflect the automatically initiating a speed change in the vehicle.

6. The method of claim 5, wherein the automatically initiating a change in speed of the vehicle occurring only upon satisfying an inequality that compares the calculated predicted speed change of the vehicle with a threshold speed change.

7. The method of claim 6, which further includes computing the initiation distance and the change in speed while the speed controller is engaged, where the initiation distance is calculated according to vehicle regression as a function of speed change.

8. An apparatus comprising:
    a speed based controller for a vehicle having propulsive engine, the speed based controller structured to:
        retain a commanded speed in the form of an operator set speed of the speed based controller to which speed of the vehicle will be regulated;
        calculate a change in speed of the vehicle in light of upcoming terrain; and
        trigger a change in commanded speed of the vehicle in advance of the upcoming terrain when the calculated change in speed of the vehicle satisfies a threshold inequality condition.

9. The apparatus of claim 8, wherein the change in commanded speed is accomplished by substituting the operator set speed with a reference speed representative of the change in commanded speed of the vehicle, and wherein an operator's set speed is stored in memory of the speed based controller and is established by a query to electronic memory.

10. The apparatus of claim 9, wherein the substitution is accomplished by adding a delta speed to the reference speed, the delta speed representative of a desired change of speed from the reference speed.

11. The apparatus of claim 10, wherein the delta speed is calculated according to the formula $V(i+1)=V(i)+a*dx$ where 'i' represents an index to velocity at a distance position 'i', 'a' is a rate of change of velocity with respect to distance, and dx is the distance traveled by the vehicle between distance points 'i' and 'i+1'.

12. The apparatus of claim 11, wherein the rate of change in speed 'a' is determined according to a regression as a function of the speed change.

13. The apparatus of claim 8, wherein the change in speed estimated by the controller is based upon a performance model of the vehicle structured to predict change in velocity in light of a change in grade of terrain upon which the vehicle is predicted to traverse, wherein the performance model includes a motoring power or a maximum power of the engine depending upon whether a grade of the upcoming terrain is negative or positive, a power required for the vehicle to maintain a steady cruise set speed, a length of a grade segment, a mass and the speed of the vehicle, and a grade power.

14. The apparatus of claim 13, wherein the change in commanded speed of the vehicle is triggered when the change in speed estimated by the controller satisfies an inequality conditional relative to a threshold change in speed.

15. An apparatus comprising:
a vehicle having a propulsive engine; and
a vehicle cruise control system configured to regulate operation of the engine by increasing or decreasing power to the driveline, the control system having a physics based estimator structured to predict a speed change of the vehicle in light of upcoming terrain data, the control system structured to change speed of the vehicle over a predetermined distance in advance of the terrain data that gives rise to the speed change of the vehicle based on the predicted speed change.

16. The apparatus of claim 15, wherein the predetermined distance is calculated based upon the predicted speed change of the vehicle and the predicted speed change is based upon a performance model of the vehicle structured to predict change in velocity in light of a look ahead window of the upcoming terrain grade upon which the vehicle is predicted to traverse, wherein the performance model includes a motoring power or a maximum power of the engine depending upon whether the upcoming terrain grade is negative or positive, a power required for the vehicle to maintain a steady cruise set speed, a length of the grade segment, a mass and the speed of the vehicle, and a grade power.

17. The apparatus of claim 15, wherein the change in speed and the fixed distance are constants stored in electronic memory.

18. The apparatus of claim 15, wherein the terrain data is a discretized set of data points representative of terrain.

19. The apparatus of claim 18, wherein the data points representative of terrain are values that represent terrain grade at an upcoming position relative to the vehicle position.

20. The apparatus of claim 15, wherein the data points are distributed at defined intervals, wherein the change in speed over a distance interval is accomplished by adjusting set speed of the cruise control system.

21. The apparatus of claim 15, wherein a mode of the control system is altered when the control system triggers a change in speed of the vehicle, the mode to which the control system is altered including one of a pre-uphill speed up mode, and a pre-downhill slow down mode.

* * * * *